INVENTOR.
LAWRENCE T. STEWART

3,191,471
LATHE TOOL HOLDER
Lawrence T. Stewart, 439 1st St., Benicia, Calif.
Filed Nov. 29, 1962, Ser. No. 240,891
1 Claim. (Cl. 82—36)

My present invention relates to metal working machine tools and more particularly to a new and improved tool holder for lathe tools and it has for one of its objects to provide a tool holder by which a plurality of tools having different metal working characteristics may be mounted in a unitary manner upon a lathe tool supporting carriage for a succession of turning opreations.

Another object of the invention is to provide a novel tool supporting clamp that is adapted to be secured upon the tool carriage of a conventional lathe having jaws with tool accommodating bores formed in the opposed faces thereof by which tools having different metal cutting characteristics may be set up and positioned in working relationship with work mounted between the head and tail stocks of a lathe for a series of related operations in a simple and convenient manner.

A further object of the invention is to provide a tool supporting clamp for mounting upon the tool rest of a conventional lathe by which a plurality of metal cutting tools can be initially set up and secured in operating relation with work mounted between the head and tail stocks of a lathe for performing different related operations as a continuous operation.

Other objects and advantages will be in part evident to those skilled in the art and in part pointed out hereinafter in the following description taken in connection with the accompanying drawing wherein like numerals refer to like parts throughout the several views.

Figure 1:
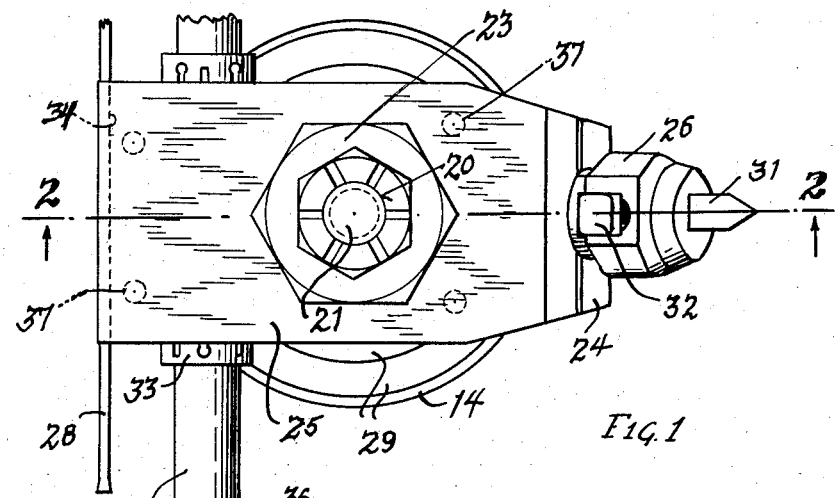
FIGURE 1 is a top view of my improved lathe tool holder.
Figure 2:
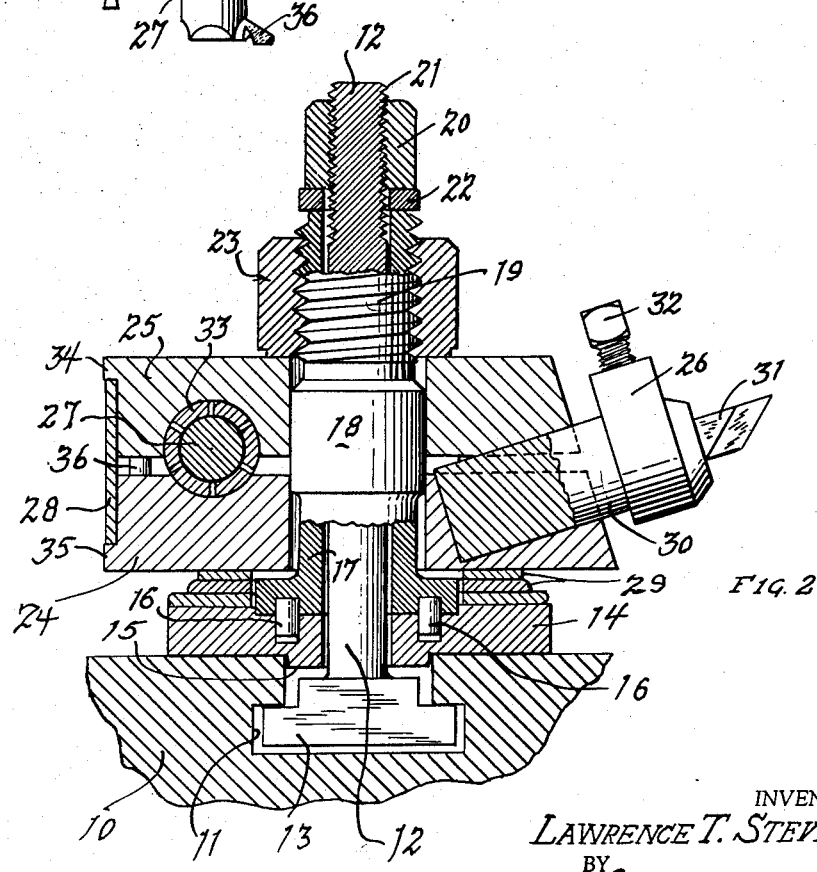
FIGURE 2 is a vertical sectional view taken along line 2—2 of FIGURE 1 looking in direction of arrows.

As pointed out hereinabove my invention is primarily intended for use with a conventional lathe and the improvement may be said to consist of means as a substitute for the usual tool post carried by the lathe tool carriage. It will permit the setting up of the lathe for a number of operations that may be involved in a particular job that might include facing, threading, boring, and cutting off as a final step. With my invention an assembly of the appropriate tools for these operations is possible as an initial and preparatory step which will avoid the delays and inconvenience experienced when the tools for the several operations are required to be changed and mounted individually one after the other upon the tool post or other fixture such as is required for each particular operation.

As will be described my tool holder is designed to carry tools for different lathe work as for example, turning, thread cutting, boring and cutting off. The several tools may be assembled and set up on the lathe tool carriage and conveniently brought into working relation with work mounted between the head and tail stocks of a lathe in a convenient and effective manner.

In the accompanying drawing the numeral 10 designates the upper portion of a conventional lathe tool carriage having a T-slot 11 in which a bolt 12 having a T-slot engaging head 13 is adapted to be mounted in a vertical position. Positioned over the T-slot 11 of the tool carriage there is a bearing plate 14 that has a laterally extending T-slot engaging boss 15 which will prevent a turning thereof with respect to the tool carriage 10. Splined or keyed to the bearing plate 14 by pins 16 there is a tubular post 17 which has a cylindrical intermediate portion 18 and a threaded upper end 19. This tubular post 17 is clamped in vertical position upon the bearing plate 14 by means of a nut 20 at the upper threaded end 21 of the bolt 12 which bears upon a washer 22. Threaded upon the tubular post 17 there is a larger nut 23 which will preferably be of the same size as the hexagonal head of the tail stock securing bolt or nut whichever the case may be. Positioned over the tubular post 17 I provide a lower clamp forming jaw 24 which in cooperation with an upper jaw 25 of comparable dimensions form a clamp between which a cutting tool support 26, a boring tool support 27, and a cut-off tool 28 may be set up at the proper position in a simple and convenient manner for the work to be done. As an additional feature I may provide a plurality of shims or washers 29 bewteen the bearing plate 14 and the lower jaw 24 of the clamp where a change in the height of the clamp is desired. The tool support 26 is inclined at an angle and it has a cylindrical shank 30 that is adapted and arranged to carry a hardened steel tool 31 which is secured thereupon by a set screw 32. To accommodate boring tool supports of different diameters I may also provide an expansion sleeve 33 that will conform with accommodating recesses in the opposite faces of the clamp forming jaws 24 and 25.

With the above arrangement it will be seen that by releasing the nut 23 upon the threaded tubular post 17 the clamping jaws 24 and 25 may be turned about the cylindrical portion 18 of the tubular post 17 to bring and clamp any one of the particular tools carried thereby, into an operating position with relation to work mounted upon the lathe by a turning of the conventional tool rest feed screw customarily provided on lathes of standard design.

A feature of my invention is that the cutting points of each of the tools may be set up at the proper level with respect to the axis about which the work upon the lathe is turning and therefore a change from one type of operation to another can be made by simply backing off the nut 23 and turning the clamp forming jaws 24 and 25 about the cylindrical portion 18 of the tubular post 17 to thus bring the bit of one of the tools into an operative position. As here shown the tool 31 is ground so that it may be used for cutting threads when the tool carriage of the lathe is under control of its lead screw or this tool may be set at an angle in either direction from a vertical plane to position either of its angled sides for facing a vertical surface on work carried by the lathe by simply turning the shank 30 of the tool holder 26 where clamped between the jaws 24 and 25. At the opposite end of the clamping jaws 24 and 25 I provide two opposed lips 34 and 35 between which the flat cut-off tool 28 may be held. This boring tool support 27 has a removable bit 36 and to retain the clamping jaws 24 and 25 in proper register with each other I provide a plurality of pins 37, one end of each of which to be fixed in one of the jaws with its other end in sliding fit within an accommodating bore of the other jaw.

While I have, for the sake of clearness and in order to disclose my invention so that the same can be readily understood, described and illustrated a specific form and arrangements, I desire to have it understood that this invention is not limited to the specific form disclosed, but may be embodied in other ways thta will suggest themselves to persons skilled in the art. It is believed that this invention is new and all such changes as come within the scope of the applied claim are to be considered as part of this invention.

Having thus described my invention, what I claim and desired to secure by Letters Patent is:

In a lathe tool holder of the character described, the combination of a tubular post adapted and arranged to be carried in a vertical position by the tool carriage of a lathe, said tubular post having a cylindrical portion intermediate its ends, a bolt having a T-slot engaging head and a cooperating nut thereon for securing said tubular post upon the said tool carriage of a lathe, a pair of superimposed tool clamping members having bores for positioning same upon said tubular post, said clamping members having faces forming an angularly disposed bore at one side of said central bore and portions of a horizontal boring tool supporting bore at the other side of said central bores, and overhanging jaws on the face of said clamping member for supporting a flat cut-off tool a post supporting means having a T-slot engaging extension upon which said tubular post is keyed, and threaded means carried by said tubular post operating independently of said bolt for securing said clamping members in clamping engagement with one or more metal cutting tools in the bores of said clamping members, whereby the position of said clamping members may be changed without disturbing the attachment of said tubular clamping post upon the lathe carriage.

References Cited by the Examiner
UNITED STATES PATENTS

| | | | |
|---|---|---|---|
| 1,063,184 | 6/13 | Colton | 82—37 |
| 1,246,226 | 11/17 | Blackinton | 82—36 |
| 2,324,603 | 7/43 | Strobl. | |
| 2,363,215 | 11/44 | Williams | 82—37 |
| 2,369,600 | 2/45 | Nielsen. | |

WILLIAM W. DYER, Jr., *Primary Examiner.*